Patented Feb. 24, 1942

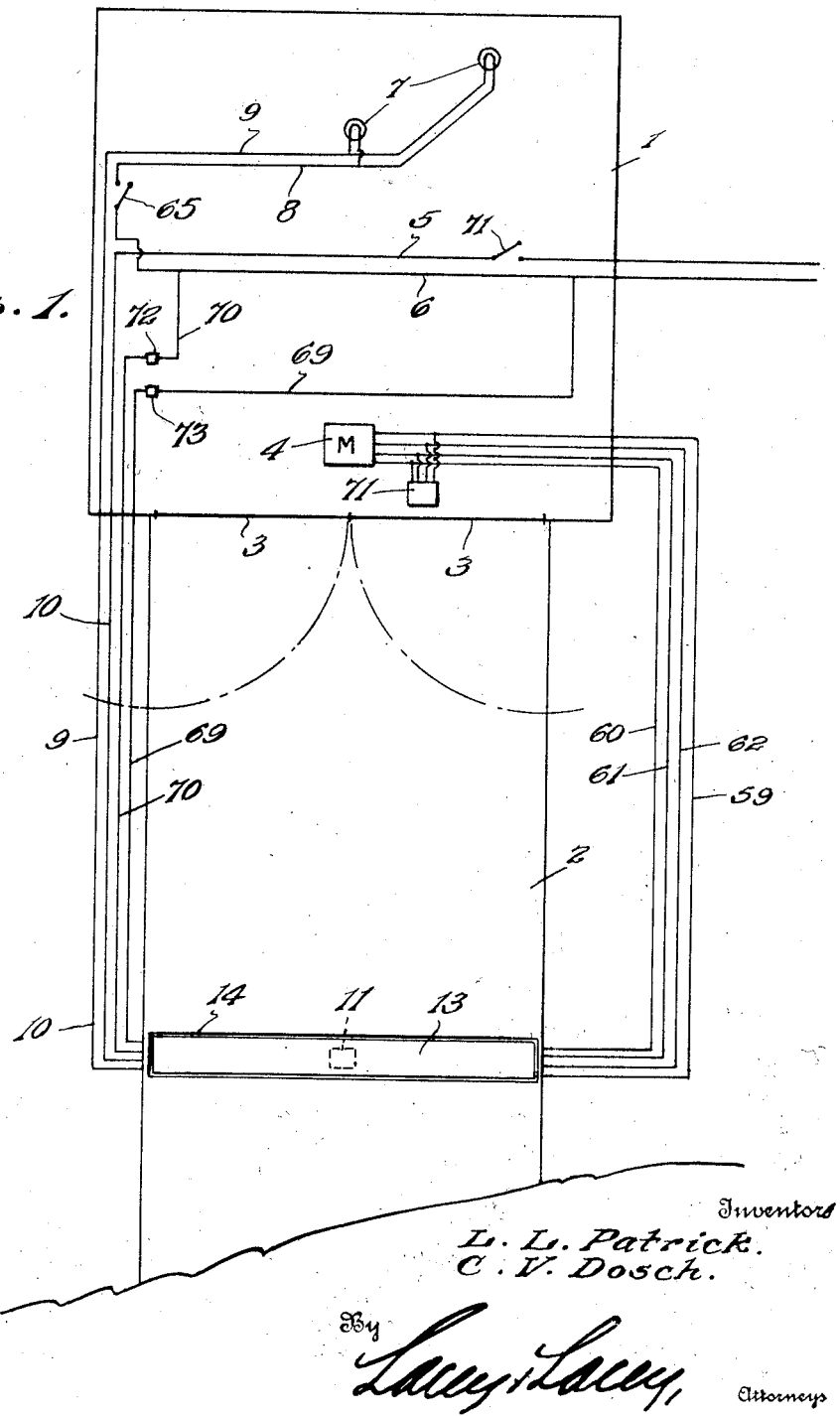

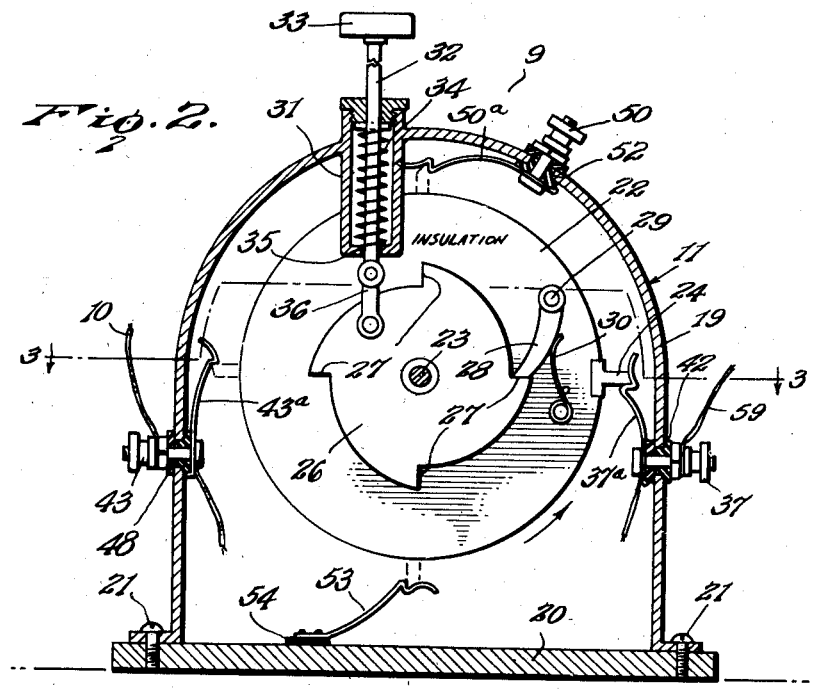

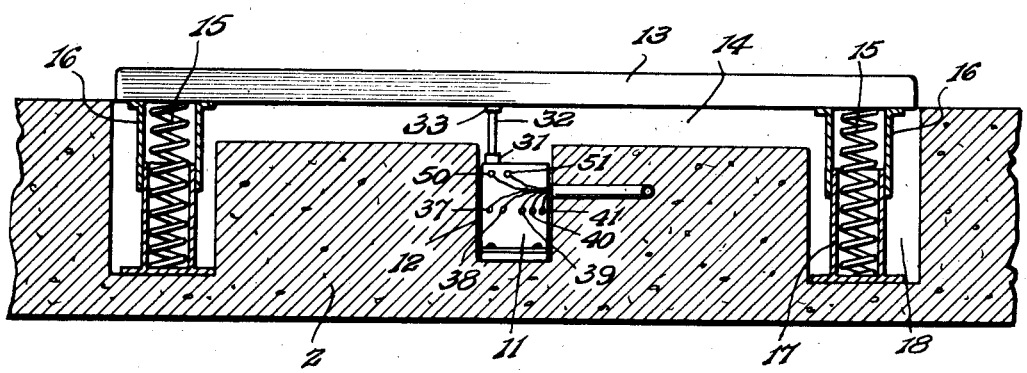
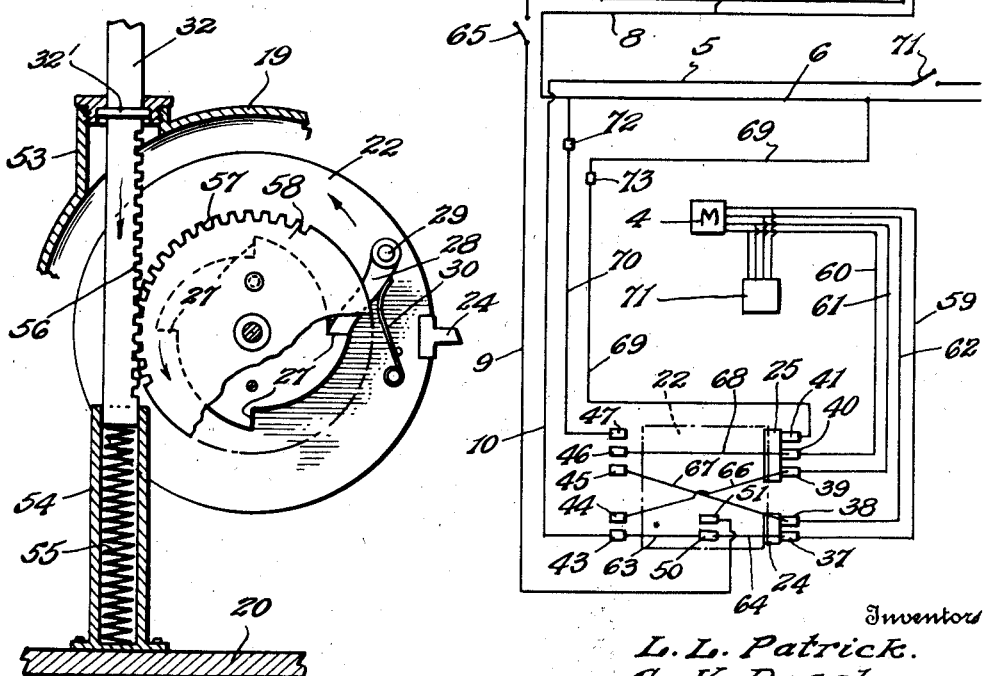

2,274,563

UNITED STATES PATENT OFFICE 2,274,563

REVERSING SWITCH

Leon L. Patrick and Clarence V. Dosch,
Evansville, Ind.

Application May 31, 1938, Serial No. 210,963

1 Claim. (Cl. 200—8)

This invention relates to a garage door opening and closing device, and it is one object of the invention to provide a device by means of which a garage door may be opened as an automobile approaches the garage and the door also closed as an automobile drives away from a garage. It will thus be seen that it will not be necessary for the driver to alight from the automobile in order to open the door when approaching the garage or after driving out of the garage and a great deal of time will be saved and annoyance prevented.

Another object of the invention is to not only provide a device by means of which a circuit may be closed through a motor to effect opening of the doors of a garage but also to permit light within the garage to be turned on after the doors have been opened and the lights also extinguished after an automobile has been driven out of a garage but prior to closing of the doors.

It is another object of the invention to provide a switch constituting a reversing switch and of such construction that it may be mounted within a cavity formed in a driveway under an actuating bar which extends across the driveway so that as an automobile is driven along the driveway the wheels of the automobile will pass over the actuating bar and cause the switch to be operated.

It is another object of the invention to provide a switch so constructed that step by step movement may be imparted to a rotatably mounted drum and successively moving bridging strips carried by the drum into position for first closing a circuit through a motor to open the doors of the garage, then to a position in which light within the garage will be illuminated, then to a position for again closing a circuit through the motor but reversing flow of current so that the doors will be closed and then to a neutral position where it will be ready to be moved to the first motor energizing position.

The invention is illustrated in the accompanying drawings, wherein

Figure 1 is a wiring diagram of the improved garage door opening and closing mechanism, the diagram being shown in operative relation to a garage under a driveway, Figure 2 is an enlarged sectional view taken vertically through the switch which is mounted in the driveway and adapted to be actuated by an automobile passing over a cross bar in the driveway, Figure 3 is a sectional view taken transversely through the switch along the line 3—3 of Figure 2, Figure 4 is a sectional view taken transversely through the driveway and showing the manner in which the switch and the switch operating bar are mounted, Figure 5 is a fragmentary view illustrating a modified form of switch, and Figure 6 is a wiring diagram bringing out the manner in which circuits are closed through the motor by the switch.

This improved garage door operating mechanism is to be installed in operative relation to a garage 1 and the driveway 2 of a garage and operated by an automobile moving along the driveway towards or away from the garage. The garage is provided with the usual doors 3 which, in the present illustration, have been shown hinged to swing outwardly, but it is to be understood that a single door may be used and the door moved vertically into and out of a closed position instead of being hinged and swinging horizontally. Any conventional means for moving the door or doors into and out of a closed position may be employed and operated through the medium of a motor 4 which is a reversible motor so that it may be run in one direction to open the doors and reversed when the doors are to be closed. This motor will be mounted at any convenient location. Power wires 5 and 6 enter the garage for supplying current to the motor and to light 7, and upon referring to Figures 1 and 6, it will be seen that the light wires 8 and 9 lead from the line wire 6 while the wire 5 is provided with an extension or branch wire 10. The vehicle actuated switch, which is indicated in general by the numeral 11, is mounted in a pit or chamber 12 formed in the driveway 2 midway the width thereof and at some distance from the garage entrance. A cross bar 13 extends across the driveway and this cross bar operates in a trench or recess 14 formed across the driveway. Springs 15 are disposed under ends of the cross bar to normally maintain it in a raised position, as shown in Figure 4, and these springs are enclosed in upper and lower sleeves 16 and 17, the sleeves 17 being mounted vertically in pits or chambers 18 at ends of the trench 14 and the sleeves 16 being mounted upon end portions of the cross bar and depending therefrom for telescoping engagement with the lower sleeves 17. The springs are of sufficient strength to maintain the cross bar in its raised position, except when the cross bar is subjected to the action of a heavy weight, such as an automobile passing over the cross bar. Therefore, an unauthorized person desiring to enter the garage cannot cause the doors to open by stepping upon or jumping upon the cross bar.

The switch 11 has a casing 19 which is detachably mounted upon a base 20 by screws or equivalent removable fasteners 21 and within the casing is disposed a drum 22 rotatably mounted through the medium of a shaft 23 which has its end portion engaged through openings formed in the side wall of the casing. Bridging bars 24 and 25 are carried by the drum, and these bars extend longitudinally of the drum in alinement with each other. Since the drum is formed of insulating material, the two bridging bars will be insulated from each other. A ratchet wheel 26 is loosely mounted upon the shaft 23 at one end of the drum and formed with circumferentially spaced teeth 27 for engaging a pawl 28 which is pivoted to the adjacent end face of the drum, as shown at 29, and yieldably held in position for engagement by the teeth 27 through the medium of a spring 30. A cylindrical sleeve or barrel 31 is mounted through the upper portion of the casing 19 over the ratchet wheel 26 and through this barrel slidably passes a plunger 32 which projects upwardly a sufficient distance for the head 33 at its upper end to engage the under face of the cross bar 13. Therefore, when the cross bar is moved downwardly by the weight of an automobile driven over the cross bar, the plunger will be forced downwardly in opposition to action of the spring 34 housed in the barrel 31, and after the wheels of the automobile have passed off the cross bar and the cross bar is moved upwardly by the springs 15, the plunger will be moved upwardly. The lower end of the plunger extends through the opening 35 at the bottom of the sleeve or barrel 31, and to the lower end of the plunger is pivotally connected a link 36 which extends downwardly therefrom and at its lower end is pivoted to the ratchet wheel. A downward movement of the plunger imparts a one-quarter revolution to the ratchet wheel and since the pawl 28 is held in engagement with a tooth 27 of the ratchet wheel the drum will have a one-quarter revolution imparted to it. As the plunger moves upwardly, turning of the ratchet wheel will be reversed and another tooth brought into position for engagement by the pawl. It will thus be seen that step by step rotary movement may be imparted to the drum.

Terminal posts 37, 38, 39, 40 and 41 are secured through the casing 19 at one end thereof and these terminal posts carry at their inner ends resilient contact strips 37a, 38a, 39a, 40a and 41a which are extended in a direction circumferentially of the drum and formed with detents at their ends for engagement by the bridging bars 24 and 25. The contact strip serves not only as contacts for engagement by the contact bars but also as latches for engaging these bars and holding the drum in a set position after the drum has had a quarter revolution imparted to it and the ratchet wheel is returning to its normal position as the plunger moves upwardly. Insulation is provided about the terminal posts, as shown at 42, to insulate them from the walls of the casing and prevent a short circuit when the contact strips or bars 24 and 25 are in engagement with the contact strip carried by the terminal posts. Similar terminal posts 43, 44, 45, 46 and 47 are secured through the casing at the opposite end thereof and these terminals are insulated from the casing by insulating sleeves 48 and at their inner ends carry resilient contact strips 43a, 44a, 45a, 46a and 47a, corresponding to the resilient contact strips previously mentioned and terminating in detents for engaging the contact bars 24 and 25. A pair of terminal posts 50 and 51 are secured through the upper portion of the casing and insulated therefrom, as shown at 52, and at their inner ends carry resilient contact strips 50a and 51a extending circumferentially of the drum and terminating in detents for engagement by the contact bar 24, and under the drum there has been provided a latching strip 53 which is secured to the base but insulated therefrom, as shown at 54, and terminates in a detent at its free end for engagement by the contact bar 24 when this contact bar is in its lowermost position. The resilient contact strips or latching strips are spaced from each other equal distances circumferentially of the drum, and since the contact bars are successively moved into position for engagement with the detents at the free ends of these latching strips the drum may have step by step movement imparted to it and held in the adjusted position as the ratchet wheel returns to its initial position during upward movement of the plunger.

Instead of having the plunger mounted as shown in Figure 2 and connected with the ratchet disk 26 by a link 36, the plunger may be slidably mounted through a neck 53 extending upwardly from the casing and the lower end of the plunger slidably engaged in a sleeve 54 which is secured to the base 20 and houses a spring 55 serving to yieldably resist downward movement of the plunger. Upward movement of the plunger is limited by a collar 32' and along one side the plunger is cut to form teeth providing a rack 56 meshing with teeth 57 of a disk 58 which fits loosely about the shaft 23 and is secured to the ratchet disk 26 by rivets 59. Downward movement of the plunger will cause rotation in one direction to be imparted to the disk 58 and the ratchet wheel 26 riveted thereto and, when the plunger is allowed to move upwardly under influence of the spring 55, the disk 58 and the ratchet disk 26 will be turned in a reverse direction and returned to the normal position shown in Figure 5. It will thus be seen that with the construction illustrated in Figure 2 or in Figure 5 step by step rotary motion may be imparted to the drum and that after each partial rotation of the drum the ratchet disk will return to its normal position but the teeth 27 will be successively engaged by the pawl 28 carried by the drum.

Circuit wires 59 and 60 are provided for conducting current through the field of the motor and causing rotation of the motor in one direction, and upon referring to Figure 6, it will be seen that these wires are secured to the terminal posts 37 and 40. Other circuit wires 61 and 62 are provided for conducting current through the field of the motor and causing rotation of the motor in a reverse direction, and these wires are secured to the terminal posts 39 and 38. The wire 9 is secured to the terminal posts 51 and the wire 10 is secured to the terminal post 43, and upon referring to Figure 6, it will be seen that the terminal post 50 is connected with the terminal post 43 by a wire 63 and with the terminal post 37 by a wire 64. Therefore, when the switch 65 in the garage is closed to complete a circuit through the light 7 and the drum is turned to dispose the contact bars 24 and 25 upwardly in a position which is neutral as far as the motor is concerned, the contact bar 24 will serve as a bridge between the terminal posts 50 and 51 and a circuit will be completed through the lamp 7 and energize the lamp to illuminate the garage. A diagonally extending wire 66 connects the terminal post 44 with the terminal post 39 and another diagonally extending wire 67 connects the terminal post 38 with the terminal post 45. A straight bridging wire 68 connects the terminal post 40 with the terminal post 46 and the terminal posts 41 and 47 have secured thereto conductor wires 69 and 70 leading from the positive line wire 6.

When this garage door operating apparatus is in use, it is installed as shown diametrically in Figure 1 with the cross bar 13 extending across the driveway a suitable distance from the garage and the switch 4 under it. The motor will be mounted at a convenient point in the garage. The specific door operating means has not been shown nor have the doors themselves as any type of doors may be used and suitable mechanism including a worm gear provided for opening and closing the door which may be actuated when the motor is in operation. It is important that the door operating means include a worm gear so that, when the doors are closed, they will be held stationary and cannot be opened without starting the motor. For convenience, it will be assumed that the doors are closed and an automobile is approaching the garage. Under these conditions, the contact bars 24 and 25 will be in their lowermost or neutral position where they will be engaged by the latch means 53 which serves to hold the drum in a set position. As the automobile drives up the driveway, the front wheels pass over the bar or treadle 13 and the weight of the automobile will depress it. This will exert downward pressure upon the plunger and as the plunger moves downwardly the ratchet wheel will be rocked about the shaft 23 a one-quarter revolution and the drum will be carried with it so that the contact bars 24 and 25 will be moved to the position shown in Figure 2 and engage the contact strip carried by the posts or terminals 37 through 41 inclusive. As soon as the front wheels pass over the treadle bar 13, the springs 15 will return it to the normal position and the springs will move the plunger upwardly to restore the ratchet wheel to its normal position but the drum will be held in the adjusted position as the bridging bars 24 and 25 will be frictionally gripped by the resilient strip carried by the terminal posts. A circuit will thus be completed through the motor and as the current flows from the negative line wire 5 through the wire 10 to the terminal 43 and through the wires 63 and 64 to the terminal 37 from which it passes through the wire 59 to the motor and back through the wire 60 to the terminal 40 from which it flows through the bridging bar 25 to the terminal 41 and through the wire 69 to the positive line wire 6. This will cause the motor to rotate in a direction which will cause the door operating mechanism to move the doors to an opened position. As soon as the doors are opened, the automobile will be again driven forwardly and as the rear wheels pass over the treadle bar the plunger will be again depressed and the drum moved another quarter turn and shift the bars 24 and 25 upwardly into engagement with the resilient strips carried by the terminals 50 and 51. This uppermost position of the contact bars may be termed a semi-neutral position as the circuit through the motor will be broken but it is not a complete neutral position as the contact bar 24 will then bridge the strips carried by the terminals 50 and 51 and close a circuit through the lamps so that the lamps 7 within the garage will be lighted. The switch 65 will, of course, be closed at this time. After the automobile has been driven entirely within the garage it will be brought to a stop and a manually operated reversing switch 71 will be actuated by the driver of the automobile who will have alighted. The motor will then be turned in a direction to effect closing of the doors and the driver of the automobile can then open the switch 65 to extinguish the light and leave the garage through another entrance which may be located at any convenient point. By opening a master switch 71 in the garage after an automobile has been housed therein an unauthorized person will be prevented from starting the motor and opening the doors even by driving another automobile over the treadle bar 13.

When it is desired to drive the automobile out of the garage, the driver enters the garage and closes the master switch 71 and the switch 65 so that the lights will be turned on. The reversing switch 71 is then operated to set the motor in motion and cause it to rotate in a direction to effect opening of the doors. After the doors are opened the driver will get into the automobile and back it out of the garage. As the rear wheels move over the treadle bar 13, the plunger will be depressed to impart a quarter rotation to the ratchet wheel and the drum and the contact bars 24 and 25 will be swung downwardly toward the left of Figure 2 and brought into position for engagement by the resilient strips carried by the terminal posts 43 through 47 inclusive. This will close the circuit through the motor and the current will then flow from the line wire 5 through the wire 10 to the terminal 43 and across the contact bar 24 to the terminal 44 from which it will pass through the wire 66 to the terminal 39. From the terminal 39 the current flows through the wire 61 to the motor and back through the wire 62 through the terminal 38 from which it passes through the wire 67 to the terminal 45 and through the contact bar 25 to the terminal 47 from which it flows through the wire 70 to the positive line wire 6. The direction in which the motor rotates will thus be opposite to that in which it rotated when the bars 24 and 25 were at the right-hand side of the drum and the garage doors will be moved in a direction to close them. Movement of the contact bars 24 and 25 from the uppermost position to the left-hand position will, of course, extinguish the lights in the garage. The automobile will be brought to a stop until the doors are entirely closed and will then be again backed along the driveway so that the front wheels will pass over the treadle bar 13 and cause a quarter turn to be imparted to the ratchet wheel and drum and move the contact bars 24 and 25 to the lowermost position which is a true neutral position as the resilient strip or strips 53 merely constitute means for engaging the bridging bar or bars and holding the drum in a set position. The drum will thus be restored to the position it occupied before an automobile was driven into the garage and the apparatus will be ready to be operated for opening the doors of the garage when an automobile is driven up the driveway towards the garage. Limit switches 72 and 73 of a conventional construction are provided which are actuated by the doors to shut off the motor when the doors are fully opened or fully closed and prevent damage due to the doors not ceasing their movement at the proper time. We have, therefore, provided an apparatus for opening and closing garage doors including a switch adapted to be mounted in a pocket formed in a driveway and actuated by the wheels of the automobile, thus permitting the doors to be opened without the driver alighting from the automobile and also permitting the doors to be closed after leaving the garage without alighting from the automobile.

Having thus described the invention, what is claimed as new is:

A reversing switch for a motor comprising a casing, terminal posts carried by said casing, resilient strips carried by said terminal posts, a shaft extending through said casing, a drum rotatably carried by said shaft within the casing, bridging means carried by said drum and extending radially therefrom for engaging said resilient strips to provide connections between certain of the terminal posts, said resilient strips constituting latches for releasably holding the drum in set position, a ratchet wheel loose upon said shaft adjacent one end of said drum, a pawl carried by said drum for engagement by teeth of said ratchet wheel, a gear secured in side by side engagement with said ratchet wheel, a plunger slidable vertically through the upper portion of said casing and having rack teeth meshing with the teeth of said gear, a sleeve in said casing slidably receiving the lower end portion of said plunger, and a spring in said sleeve yieldably holding the plunger in a raised position.

LEON L. PATRICK.
CLARENCE V. DOSCH.